UNITED STATES PATENT OFFICE.

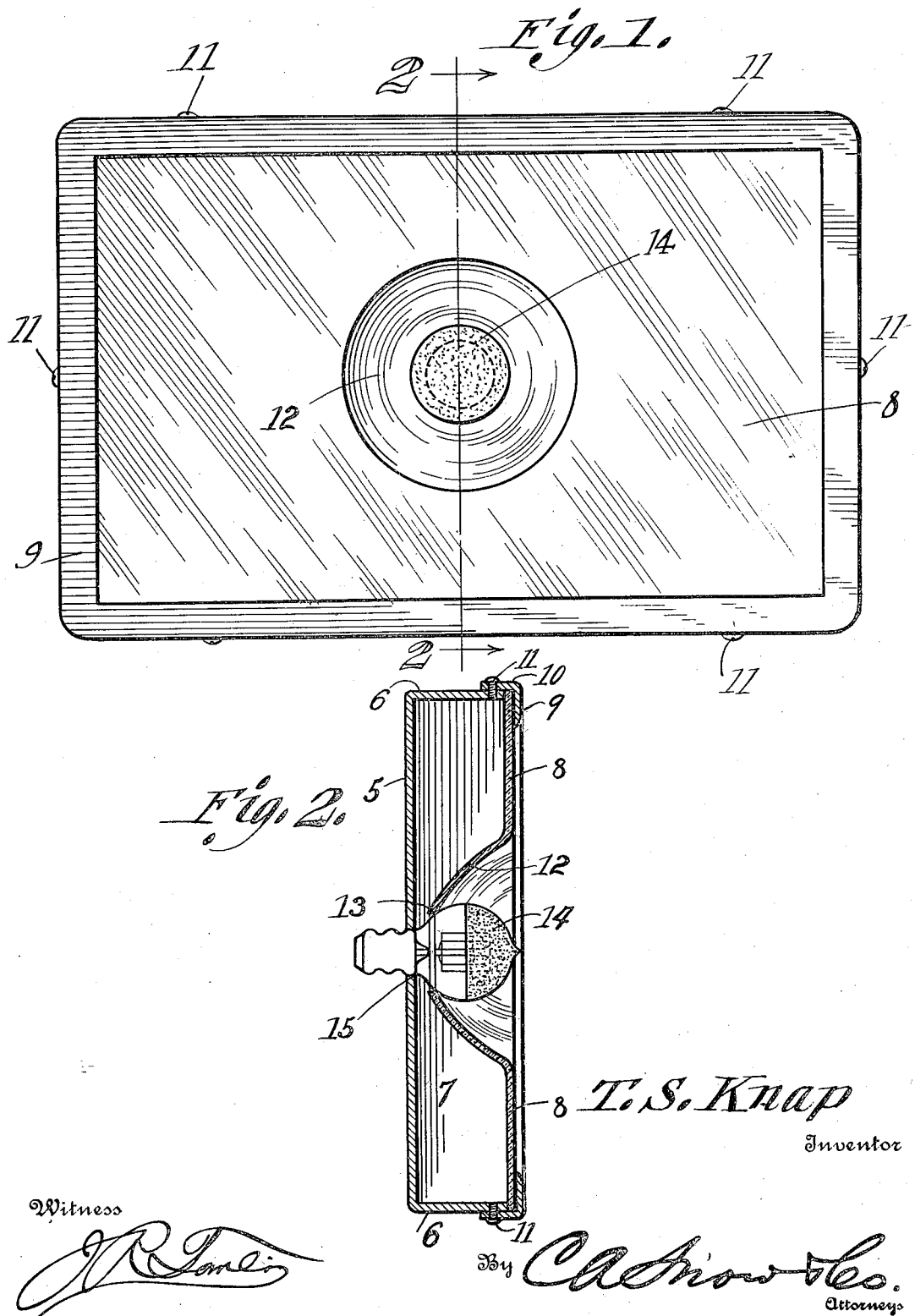

THOMAS SEYMOUR KNAP, OF BROOKLINE, MASSACHUSETTS.

SHAVING-MIRROR.

1,379,991.    Specification of Letters Patent.    Patented May 31, 1921.

Application filed March 2, 1920. Serial No. 362,817.

*To all whom it may concern:*

Be it known that I, THOMAS S. KNAP, a citizen of the United States, residing at Brookline, in the county of Norfolk and State of Massachusetts, have invented a new and useful Shaving-Mirror, of which the following is a specification.

This invention relates to improved mirrors, and it is the primary object of the invention to provide a mirror having novel means for illuminating the object to be reflected in the mirror.

A further object of the invention is to provide means for illuminating a portion of the mirror surface, to the end that the reflection in the mirror will be more clear and distinct, when used at night.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing:—

Figure 1 illustrates a front elevational view of a mirror constructed in accordance with the present invention.

Fig. 2 illustrates a sectional view taken on line 2—2 of Fig. 1.

Referring to the drawing in detail the device is shown as comprising a frame having a rear wall 5, side walls 6 and end wall 7.

The body of the device is preferably rectangular in formation but it is to be understood that the configuration of the body portion may be circular, oval or any suitable design, to meet various requirements of use.

A reflecting surface 8 forms the forward portion of the body, and is of a size to contact with the upper edges of the side and end walls 6 and 7 respectively, there being provided a frame indicated at 9, for securing the reflecting surface in position on the body, and as shown this frame comprises mirror-engaging flanges, and securing flanges 10, the securing flanges having connection with the body portion by means of the screws 11 which are shown as passing through suitable registering openings in the body, and flanges 10.

Formed substantially centrally of the reflecting surface 8 is a depressed portion 12, apertured as at 13, so that the walls of the depressed portion, adjacent the aperture will form a support for the lamp 14, used in connection with the mirror.

A lamp socket 15 is provided in the rear wall 5 of the body, to receive the lamp 14 to hold the lamp to the electric circuit supply means not shown, thus insuring the lamp being supported in proper relation with the reflecting surface at all times.

Reflecting material is provided on the walls of the depressed portion 12, so that the light rays from the lamp 14 will be reflected to the object in front of the surface 8 to illuminate the same, the lamp 14 however being preferably frosted throughout a portion of its surface to guard the object being reflected from the direct rays of the lamp.

While no means for supporting the body portion has been provided it is of course obvious that any suitable support may be employed, and if the body portion is properly connected with its electric circuit, it is obvious that the mirror may be supported directly on a chiffonnier, bureau or the like.

Having thus described the invention, what I claim as new is:—

In a device of the character described, a frame including a rear wall, side walls and end walls extending at right angles to the rear wall, a reflecting surface having a central depressed portion, and apertured to receive an illuminating lamp, said reflecting surface adapted to engage the free edges of the end and side walls of the frame, and a frame having a portion thereof contacted with the reflecting surface for securing the reflecting surface to the first mentioned frame, and means for securing the frames together.

In testimony that I claim the foregoing as my own, I have hereto affixed my signature in the presence of two witnesses.

THOMAS SEYMOUR KNAP.

Witnesses:
 RUTH M. LETERS,
 DOROTHY HARDING KNAP.